H. H. DAVIS.
SAFETY CRANK.
APPLICATION FILED DEC. 4, 1917.
1,285,065.
Patented Nov. 19, 1918.
2 SHEETS—SHEET 1.
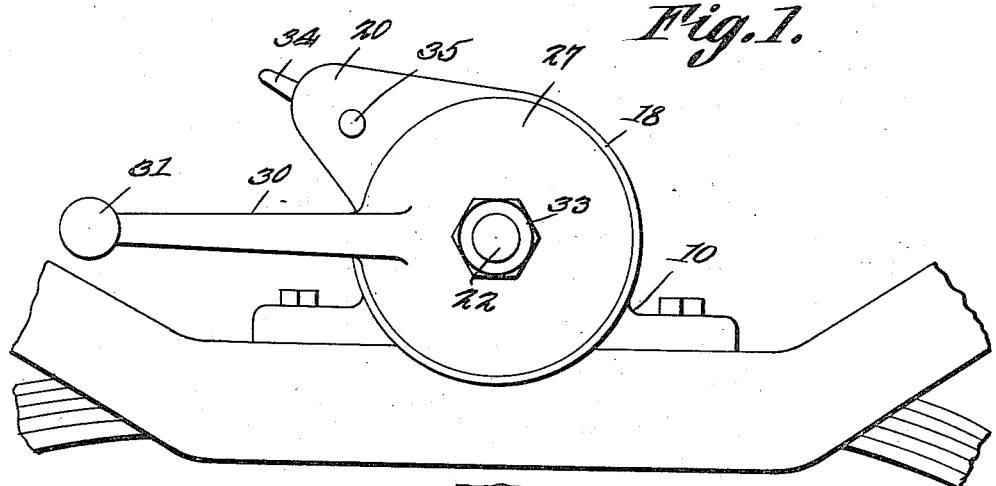
Fig. 1.
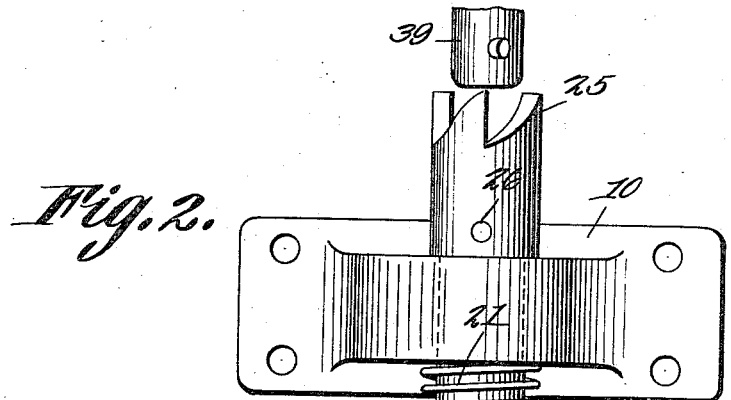
Fig. 2.
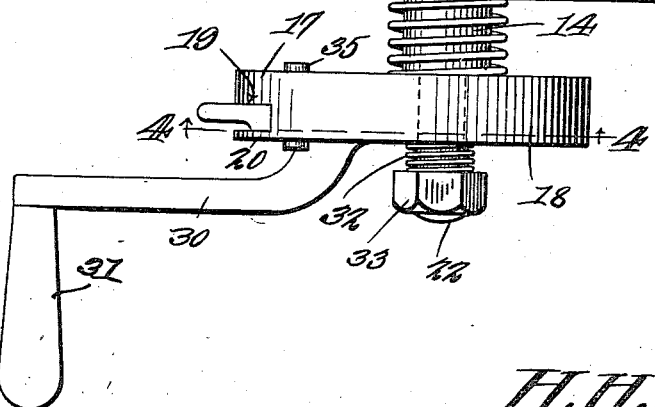
H. H. Davis, Inventor,
By C. A. Snow & Co.
Attorneys.
Witness H. H. DAVIS.
SAFETY CRANK.
APPLICATION FILED DEC. 4, 1917.
1,285,065.
Patented Nov. 19, 1918.
2 SHEETS—SHEET 2.
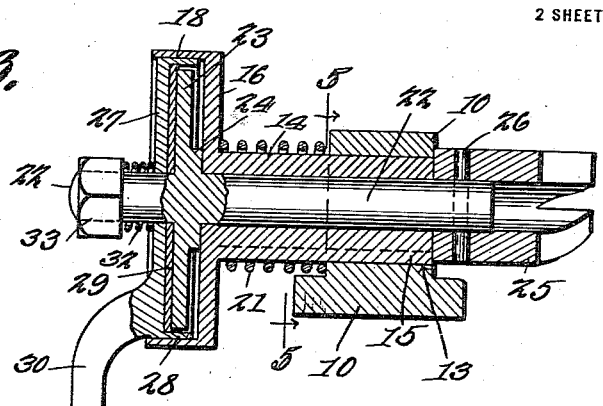
Fig. 3.
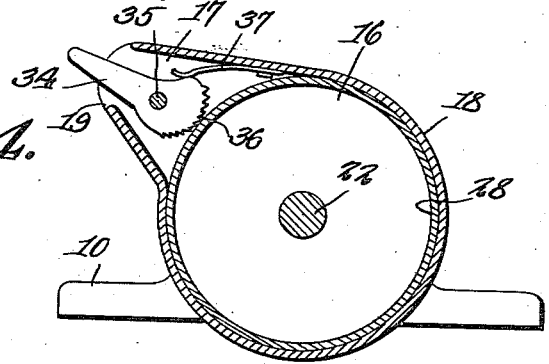
Fig. 4.
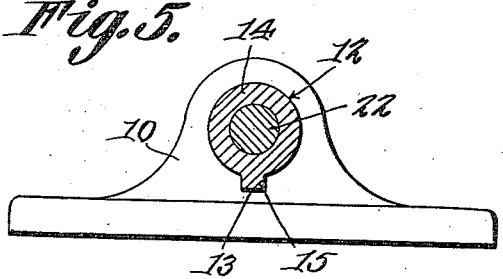
Fig. 5.
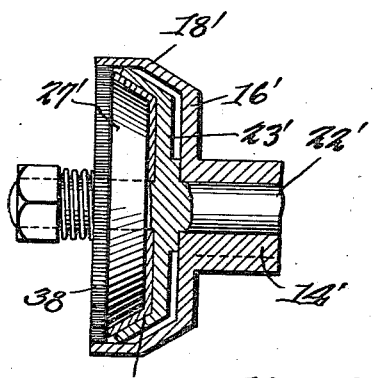
Fig. 6.
Fig. 7.
H. H. Davis, Inventor,
Witness
By C. A. Snow & Co.
Attorneys.

UNITED STATES PATENT OFFICE.

HARRISON H. DAVIS, OF THE PLAINS, OHIO.

SAFETY-CRANK.

1,285,065.

Specification of Letters Patent.   Patented Nov. 19, 1918.

Application filed December 4, 1917. Serial No. 205,365.

*To all whom it may concern:*

Be it known that I, HARRISON H. DAVIS, a citizen of the United States, residing at The Plains, in the county of Athens and State of Ohio, have invented a new and useful Safety-Crank, of which the following is a specification.

The subject of this invention is a safety crank to be used in turning over an internal combustion engine to start the same, and the objects of the invention are, first, to produce a crank which will permit the engine to be turned over but will release upon reverse motion of the engine due to back firing or the like, second, to provide a friction connection between the crank and the crank shaft, third, to provide means for locking the crank against movement in one direction, fourth, to produce a simple, durable and efficient crank.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Practical embodiments of the invention are shown in the accompanying drawings, wherein:—

Figure 1 is a view in front elevation of the device in place on an automobile, a fragmentary portion of which is shown;

Fig. 2 is a plan view;

Fig. 3 is a central vertical longitudinal section, parts broken away;

Fig. 4 is a section on the line 4—4 of Fig. 2;

Fig. 5 is a section on the line 5—5 of Fig. 3;

Fig. 6 is a fragmentary view in longitudinal section of a modified form;

Fig. 7 is a detail fragmentary view in elevation of a modified form of clutch or dog.

Referring to the drawings by numerals of reference:

In carrying out the invention a supporting block 10 is provided, the ends of the base of which are extended and apertured to receive bolts or the like by which the block is secured to the frame of a vehicle equipped with an internal combustion engine.

The block 10 is provided with an aperture 12 having a key way 13 and through the aperture slides a tubular shaft 14 formed with a longitudinal rib 15 which takes into the key way 13. A substantially circular head 16 is formed at the forward end of the shaft 14 and has an extension 17. A flange 18 is integral with the head and extends forward from the periphery of the head and its extension 17. This flange is apertured at the extreme end of the extension as indicated at 19. That portion of the flange extending from the extension 17 is bridged over by an integral front wall 20, so as to form a housing. A compression spring 21 surrounds the shaft 14 between the head 16 and block 10 for the purpose of normally retaining the shaft in its forward position.

A shaft 22 extends through the tubular shaft 14 and has turned thereon, between the ends thereof, a disk 23 formed with a central boss or annular shoulder 24. The shoulder 24 rests against the face of the head 16 and reduces the area of frictional surface. A clutch member 25 is secured to the rearwardly extending end of the shaft 22 by means of a pin 26 or in any other suitable manner.

On the forward end of the shaft 22 is loosely mounted a disk 27 formed with a rearwardly extending annular flange 28 about its periphery.

As will be seen most clearly in Fig. 3, the flange 28 encircles the disk 23 from which it is spaced. A disk 29 of leather, fiber or other suitable material is interposed between the rear face of the disk 27 and the front face of the disk 23 for the purpose of producing sufficient friction between the parts to accomplish the purpose of the device. A crank arm 30 extends radially from this disk and is provided at its outer end with the hand grip or handle 31.

A compression spring 32 surrounds the forwardly projecting end of shaft 22 and abuts the front face of disk 27 against which it is pressed by a confining nut 33 threaded on the end of the shaft.

While the right to use any of the many and well known forms of clutch to prevent reverse motion of the disk 27, the form herein shown consists of a dog 34 mounted in the housing formed on extension 17, or a pin 35 about which it oscillates. The cam face of this dog which engages the flange 28 of the disk 27 may be serrated, as indicated at 36 for the purpose of assuring a firm grip. A spring 37 may be suitably fastened to the flange 18, or other portion of the structure and press the dog into contact with the flange 28.

The end of dog 34 may extend through the opening 19 so that the dog may be released to permit reverse motion of the disk 27 when desired.

While the flange 28 is here shown smooth on its outer face, it is to be understood that the same may be corrugated or serrated to better engage the cam face of the dog 34.

In the modification shown in Figs. 6 and 7 the main structure is the same as that just described except that friction cones replace the friction disks.

The head 16' has its flange 18' formed to accommodate the cones. The cone 23' is integral with or affixed to the shaft 22' while a cone 27' is loose on the shaft 22' and enters the cone disk 23'. A friction element 29' is interposed between the cones.

The cone 27' has a crank arm, not shown, and a serrated or toothed portion 38 is formed on its periphery.

In practice the device is used after the manner of the usual crank. The shaft 14 is pushed in against the force of the spring 21 to bring the clutch 25 into engagement with the forward end of the crank shaft 39. The shaft is then rotated by turning the crank arm 30 in the usual way.

Should the engine, however, kick-back, the dog 34 will engage the disk 27, to which the crank arm 30 is secured, and keep the same from turning. At the same time the force exerted by the engine is sufficient to overcome the friction and allow the shaft 22 or 22' to turn.

Having thus described the invention, what is claimed as new and sought by Letters Patent, is:—

1. A safety crank, including a supporting block, a tubular shaft slidable through the block, a head on the shaft forming a housing, another shaft journaled in the tubular shaft, a clutch on said shaft, a friction disk rigid on said shaft and housed within the head, a friction disk loose on the said shaft and adapted to engage the first disk, a crank on the loose disk, and means for locking the loose disk against movement in one direction.

2. A safety crank, including a support, a tubular shaft slidable through the support, a head on the tubular shaft forming a housing, a shaft journaled in the tubular shaft, a friction element rigid on said shaft, a clutch on said shaft, a friction element loose on said shaft and adapted for engagement with the aforesaid friction element, a crank on the loose friction element, and means engaging the loose friction element for preventing movement thereof in one direction.

3. A safety crank, including a support, a tubular shaft keyed to and slidable through the support, a head on the tubular shaft and forming a housing, the said head having a slot at one portion of its periphery, a shaft journaled in the tubular shaft, a friction disk rigid on said shaft and housed in the head, a friction disk loose on the shaft and engaging the first mentioned disk, a dog pivotally secured to the head and extending through the slot to engage the loose disk and lock the same against rotation in one direction, a clutch member on the shaft, and a crank on the loose disk.

In testimony that I claim the foregoing as my own I have hereto affixed my signature in the presence of two witnesses.

HARRISON H. DAVIS.

Witnesses:
  O. F. ROWLAND,
  JOHN J. WOOLLEY.